US012676554B2

(12) United States Patent
Fabbro

(10) Patent No.: US 12,676,554 B2
(45) Date of Patent: Jul. 7, 2026

(54) POWER CONVERTER AND METHOD OF OPERATING A POWER CONVERTER

(71) Applicant: Infineon Technologies Austria AG, Villach (AT)

(72) Inventor: Simone Fabbro, Udine (IT)

(73) Assignee: Infineon Technologies Austria AG, Villach (AT)

( * ) Notice: Subject to any disclaimer, the term of this patent is extended or adjusted under 35 U.S.C. 154(b) by 239 days.

(21) Appl. No.: 18/670,270

(22) Filed: May 21, 2024

(65) Prior Publication Data

US 2024/0396456 A1 Nov. 28, 2024

(30) Foreign Application Priority Data

May 24, 2023 (DE) .......................... 102023113564.3

(51) Int. Cl.
H02M 3/335 (2006.01)
H02M 3/00 (2006.01)
(52) U.S. Cl.
CPC ....... H02M 3/33507 (2013.01); H02M 3/015 (2021.05)
(58) Field of Classification Search
CPC .......................... H02M 3/33507; H02M 3/015
See application file for complete search history.

(56) References Cited

U.S. PATENT DOCUMENTS

| | | | | |
|---|---|---|---|---|
| 5,991,171 | A | * | 11/1999 | Cheng ............... H02M 3/33507 |
| | | | | 363/97 |
| 9,306,614 | B2 | * | 4/2016 | Ragonese ............. H02M 3/338 |
| 2012/0313448 | A1 | | 12/2012 | Anttila |
| 2013/0088088 | A1 | | 4/2013 | Wambsganns et al. |
| 2017/0358993 | A1 | | 12/2017 | Ragonese et al. |
| 2022/0103015 | A1 | | 3/2022 | Nussbaum et al. |

* cited by examiner

*Primary Examiner* — Adolf D Berhane
(74) *Attorney, Agent, or Firm* — Harrity & Harrity, LLP

(57) ABSTRACT

A power converter is provided. The power converter includes a transformer having a primary side winding and a secondary side winding, an oscillator circuit coupled to the primary side winding forming a resonant oscillator with the primary side winding and an output circuit coupled to the secondary side winding and configured to generate an output signal based on energy received from the secondary side winding. A secondary side controller is configured to transmit a control signal based on a controlled variable related to the output signal via the transformer to the primary side controller, and the primary side controller is configured to start or stop and oscillation of the resonant oscillator based on the control signal.

17 Claims, 6 Drawing Sheets

Figures 1, 2:
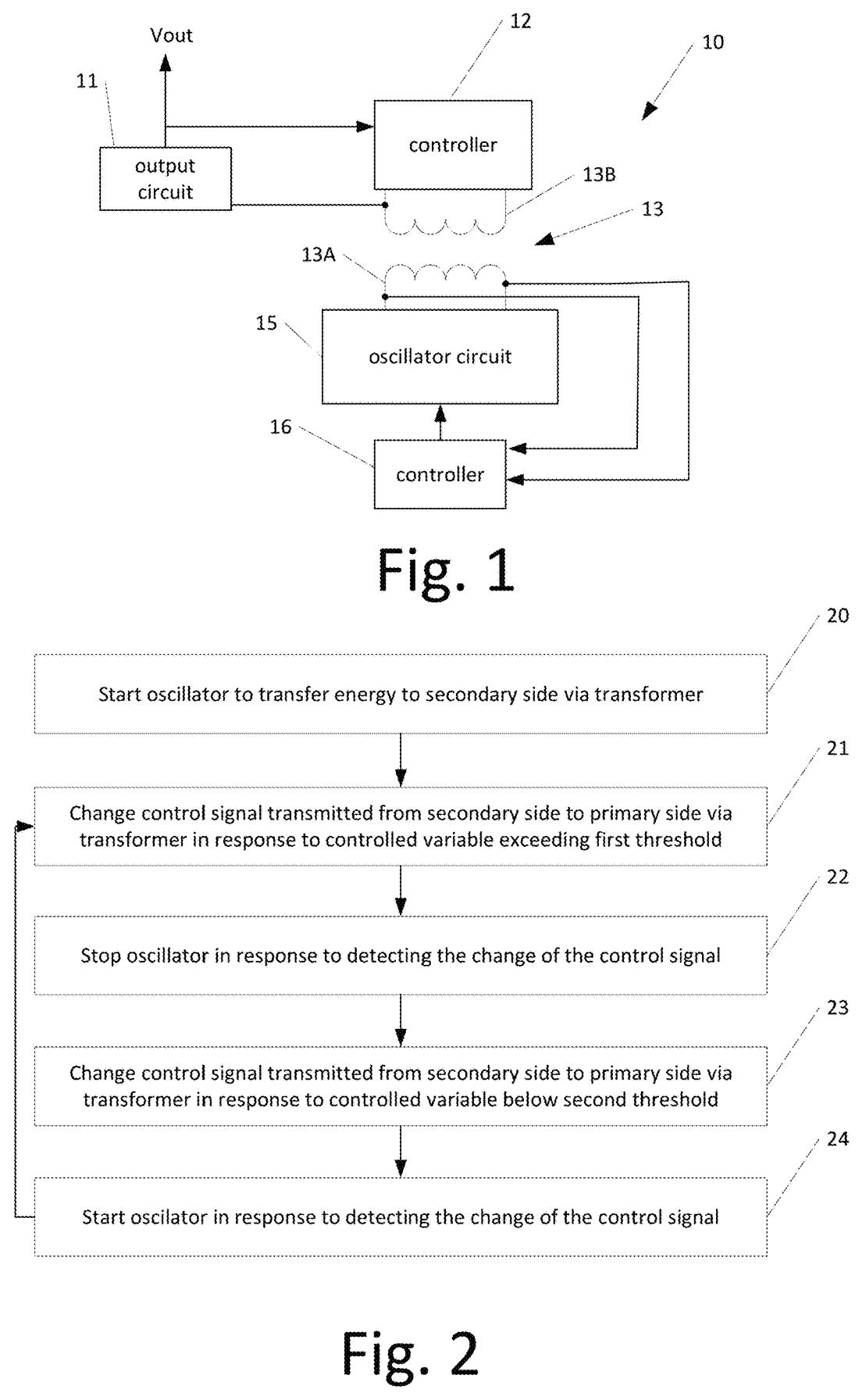

Vout

11

12

10 output circuit controller

13B

13

13A

15 oscillator circuit

16 controller

Start oscillator to transfer energy to secondary side via transformer

21

Change control signal transmitted from secondary side to primary side via transformer in response to controlled variable exceeding first threshold

22

Stop oscillator in response to detecting the change of the control signal

23

Change control signal transmitted from secondary side to primary side via transformer in response to controlled variable below second threshold

24

Start oscillator in response to detecting the change of the control signal

POWER CONVERTER AND METHOD OF OPERATING A POWER CONVERTER

CROSS-REFERENCE TO RELATED APPLICATION

This application claims priority to German Patent Application No. 102023113564.3 filed on May 24, 2023, the content of which is incorporated by reference herein in its entirety.

TECHNICAL FIELD

The present application relates to power converters and to methods of operating power converters.

BACKGROUND

Power converters are devices which are generally used to convert an input electrical power to an output electrical power, for example satisfying voltage and/or current requirements of a respective application. For example, many electronic devices are powered or charged using power converters which convert an input DC (direct current) voltage to a lower DC (direct current) voltage. A plurality of different types of DC to DC power converters exists, like buck converters, boost converters, resonant converters etc. The input DC voltage may in some cases be derived from an AC (alternating current) voltage like a mains voltage using a rectifier and/or an AC to DC power converter.

Power Converters may be divided into isolated power converters and non-isolated power converters. Isolated power converters have a galvanic separation between an input side (also referred to as primary side) receiving an input electrical power and an output side (also referred to as secondary side) outputting the converted output power. Such a galvanic isolation may for example be implemented using a transformer. Non-isolated power converters lack such an isolation. The present application generally relates to isolated topologies.

In many applications, the output voltage of the power converter needs to be regulated to a required value. For this, a feedback loop is conventionally implemented which has to cross the galvanic isolation. For example, a component like an optocoupler may be used for the feedback loop. In other implementations, capacitive couplers or inductive couplers (transformers), the latter typically much smaller than the main transformer, are used. Therefore, in such conventional solutions when the power converter is for example implemented on a printed circuit board (PCB), the transformer is placed as a standalone building block, and some additional amount of space is reserved for the feedback loop. In conventional solutions, this additional space needed is usually acceptable.

However, in lower power systems operating e.g., in the Milliwatt (mW) to Watt (W) range, modules and integrated circuits the power transformer can be integrated in a package, module integrated circuits (ICs) or with at least one of the chip dies of other integrated circuits used which carry out the power conversion. In such cases, due to cost and space requirements, it is desirable that the number of isolation elements like transformers, optocouplers or the like is kept to a bare minimum. This is because in integrated solution isolation elements typically require chip, module or package space and/or require particular expensive process options and steps to be fabricated.

SUMMARY

A power converter as defined in claim 1 and a method as defined in claim 11 are provided. The dependent claims define further implementations.

In an implementation, a power converter is provided, including: a transformer including a primary side winding and a secondary side winding; an oscillator circuit coupled to the primary side winding and forming a resonant oscillator with an inductance provided by the transformer; an output circuit coupled to the secondary side winding and configured to generate an output signal based on energy received from the secondary side winding; and a primary side controller and a secondary side controller, wherein the secondary side controller is configured to transmit a control signal based on a control variable related to the output signal via the transformer to the primary side controller, and wherein the primary side controller is configured to start an or stop an oscillation of the resonant oscillator based on the control signal.

A corresponding method of operating a power converter including transmitting a control signal based on a controlled variable related to an output signal of the power converter from a secondary side of the power converter to a primary side of the power converter via a transformer separating the primary side from the secondary side, wherein the transformer is also used to transfer energy from the primary side to the secondary side, and starting or stopping an oscillation of a resonant oscillator of the power converter including an inductance provided by the transformer based on the control signal.

The above summary is merely a brief overview over some implementations and is not to be construed as limiting in any way.

BRIEF DESCRIPTION OF THE DRAWINGS

FIG. 1 is a block diagram of a power converter according to an implementation.

FIG. 2 is a flowchart illustrating a method according to an implementation.

FIG. 7 is a flowchart illustrating a method according to an implementation.

DETAILED DESCRIPTION

Figure 3:
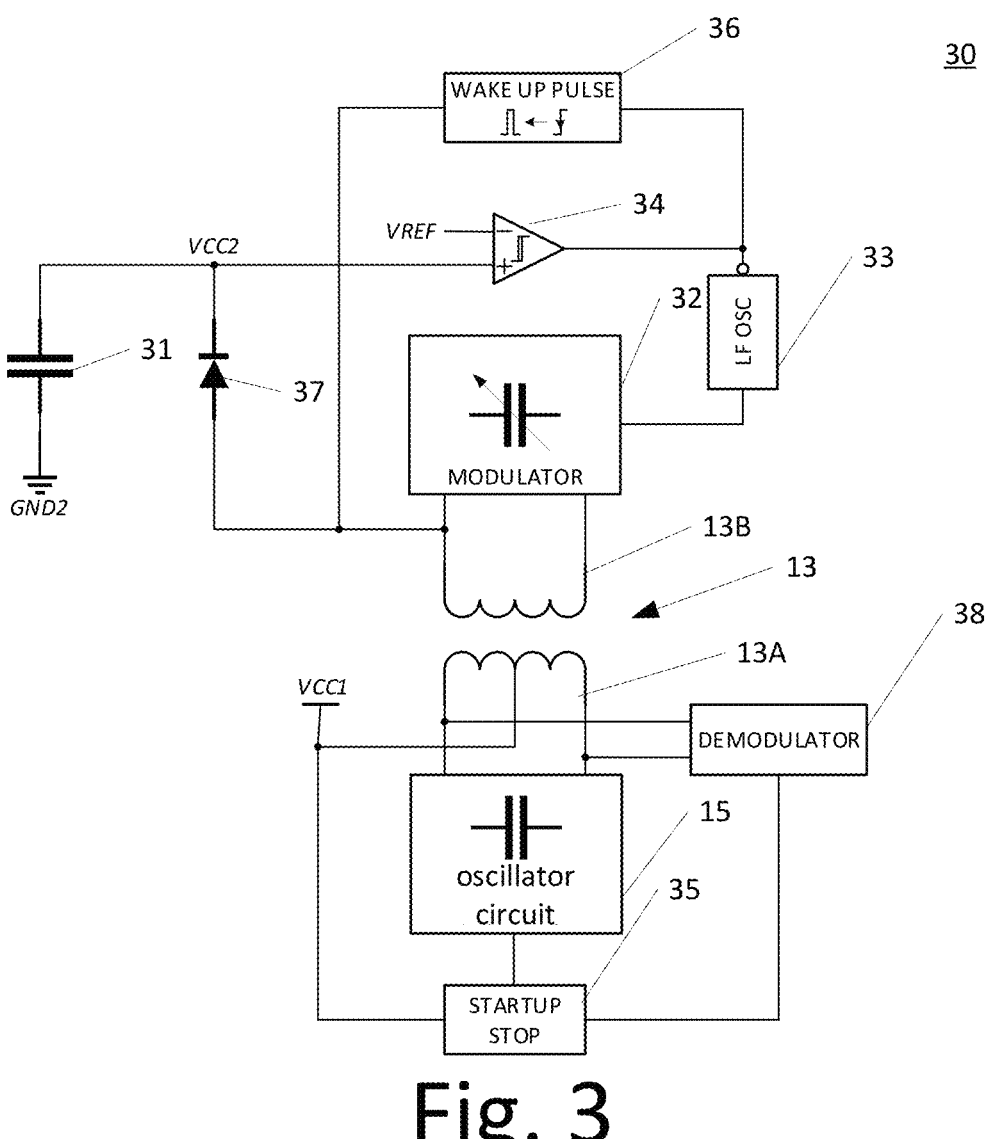
FIG. 3 is a circuit diagram of a power converter according to an implementation.

Various implementations will be described referring to the attached drawings. These implementations are not to be construed as limiting in any way. For example, while implementations will be described comprising a plurality of features (e.g., components, elements, steps, acts, events, devices), in other implementations some of these features may be omitted or may be replaced by alternative features or elements. In addition to the features explicitly described herein and shown in the drawings, further features may be provided, for example features conventionally used in power converters. For example, implementations discussed herein focus on a control of the power converter including communication from a secondary side of the power converter to a primary side to the power converter, and other features of the power converter, for example dimensioning and implementation of features like a transformer, or further stages upstream or downstream of the power converter shown, for example rectification stages or further power converter stages, may be implemented in any conventional manner.

Features from different implementations may be combined to form further implementations. Variations or modifications described with respect to one of the implementations are also applicable to other implementations and will therefore not be described repeatedly for each implementation.

Corresponding features in different figures bear the same reference numerals and will not be described repeatedly.

Turning now to the figures, FIG. 1 is a block diagram of a power converter 10 according to an implementation.

Power converter 10 in the implementation of FIG. 1 is a resonant power converter including a transformer 13. Transformer 13 comprises a primary side winding 13A and a secondary side winding 13B. An oscillator circuit 15 is coupled to primary side winding 13A and forms a resonant oscillator together with primary side winding 13A, e.g., primary side winding 13A forms at least part of the inductance of the resonant oscillator. Generally, self or mutual inductances of transformer 13 may form at least part of an inductance of the resonant oscillator. Oscillator circuit 15 may for example include one or more capacitors to form a resonant LC oscillator together with an inductance provided by transformer 13, e.g., by primary side winding 13A, or secondary side winding 13B, or both, and circuitry to maintain oscillation, for example to compensate power losses. Examples for oscillator circuit 15 will be described further below.

When the resonant oscillator thus formed oscillates, power is transferred to the secondary side winding 13B through mutual inductance. This electrical power is provided to an output circuit 11. Output circuit 11 may include for example a filter and/or storage element like a filter and storage capacitor which smooths the output power (filtering), e.g., output voltage ripple, inter alia by storing electrical energy during times when no energy is transferred from the primary side to the secondary side, a rectifier like a rectifying diode or other conventional components to provide an output power having an output voltage Vout based on the energy received.

Power converter 10 further comprises a secondary side controller 12 and a primary side controller 16. While controllers 12, 16 are shown as single blocks in FIG. 1, as will be explained further below using examples they may include a plurality of different components like comparators, modulators, demodulators, logic circuits, start/stop circuitry for starting and stopping an oscillation of the resonant oscillator described above. Primary side controller may also be at least partially implemented by oscillator circuit 15.

Secondary side controller 12 is configured to transmit a control signal based on a controlled variable related to the output signal via transformer 13 to the primary side controller 16. A controlled variable is a variable which is used to control operation of power converter 10 such that the output power has desired properties. For example, the controlled variable may be the output voltage Vout, which may be compared to a reference voltage as a target voltage, such that the output voltage is regulated to the reference voltage. In other implementations, the controlled variable may be the output current, such that a corresponding constant current is output. In yet other implementations, the control variable may be derived from the output voltage or output current, for example a voltage derived from the output voltage through a voltage divider, a voltage representative of the current for example obtained by a shunt resistor, or any other variable related to the power output by power output circuit 11. In yet other implementations, the controlled variable may be the output power or derived therefrom, e.g., to provide a constant power output.

To transmit the control signal, controller 12 is configured to apply a first signal to secondary side winding 13B which induces a signal in primary side winding 13A, which is then sensed by primary side controller 16. The first signal to secondary side winding 13B may be applied using a modulator which modulates the signal (for example due to the energy transfer) otherwise provided on secondary side winding 13B, for example with a modulation having a predefined frequency. The first signal of the control signal may for example have at least two states, one corresponding to a presence of such a modulation and the other corresponding to the absence of such a modulation. Furthermore, the control signal may also comprise a second signal like a pulsed signal to secondary side winding 13B, which causes an energy pulse to the primary side and to oscillator circuit 15, which may cause a start of oscillator circuit 15. This energy pulse is also referred to as wake-up pulse.

If oscillator circuit 15 is directly restarted by the energy pulse, in this sense oscillator circuit 15 itself serves as part of controller 16 (as it restarts itself), and controller 16 when stopping oscillation sets the state of oscillator 15 such that it can be restarted by such an energy pulse.

In other words, the control signal may comprise two distinct signals that are applied for different purposes. The first signal is used for controlling the controlled variable with respect to an upper threshold, e.g., to stop the oscillation when the controlled variable (as absolute value) exceeds the upper threshold. The second signal is used for restarting the resonant oscillator including oscillator circuit 15 when the controlled variable falls below a lower threshold.

Depending on the received control signal, primary side controller 16 starts or stops the oscillation of the resonant oscillator. For example, in this way oscillation of oscillator circuit 15 may be stopped when the controlled variable gets too high, or exceeds an upper threshold value, and may be started again when the controlled variable gets too low, for example falls below a lower threshold value. This enables regulating of the controlled variable to a desired value. It should be noted that the terms "gets to high" or "gets too low" and similar terms like "exceeding" or "falling below" also include cases where the controlled variable is a negative current or voltage, and the absolute values thereof get too high or too low.

By transmitting the control signal via transformer 13, no additional feedback path with an additional transformer or an optocoupler is needed, and also no additional winding is needed, as the control signal is transmitted from secondary side winding to 13B to primary side winding 13A.

FIG. 2 is a flowchart illustrating a method according to an implementation, which may be implemented in the power converter 10 of FIG. 1 and gives an example operation of power converter 10. However, application of the method of FIG. 2 is not limited to power converter 10 but the method may also be implemented in other power converters, for example power converters described further below.

At 20, the method of FIG. 2 comprises starting an oscillator to transfer energy to a secondary side of a power converter via a transformer. For example, in FIG. 1 at startup controller 16 starts oscillation of the resonant oscillator formed by oscillator circuit 15 and primary side winding 13A, to thus transfer energy via the transformer 13 to secondary side winding 13B and to the output via output circuit 11.

At 21, the method comprises changing a control signal, e.g., the first signal of the control signal mentioned above transmitted from the secondary side to the primary side via the transformer also used to transfer energy to the secondary side in response to a controlled variable exceeding a first threshold. Changing the control signal may for example comprise turning off a modulation causing the first signal not to be sent, or turning on a modulation of a signal on a secondary side winding like winding 13B to cause the first signal to be transmitted to the primary side, or changing a modulation, such that the transmitted first signal changes.

At 22, the method comprises stopping the oscillator in response to detecting the change of the control signal. When the oscillator, for example the oscillator shown in FIG. 1 is stopped, the energy transfer to the secondary side stops, and the controlled variable starts to decrease (for example voltage or current decreases).

At 23 the control signal is changed in response to the control variable falling below a second threshold. The second threshold is smaller than the first threshold. Therefore, a hysteresis is implemented. The first and second thresholds may be symmetric or asymmetric about a target value for the controlled variable. The size of the interval between the first threshold and the second threshold may depend on how exactly controlled variable should be kept for a certain application.

Changing the control signal at 23 may comprise sending the second signal of the control signal mentioned above, e.g., sending an energy pulse from the secondary side to the first side, to restart the oscillator.

At 24, the method comprises starting the oscillator in response to detecting the change of the control signal at 23. For example, the oscillator may be started directly by the wake-up pulse, and the oscillation may be maintained using the controller.

The changing of the control signal at 23 may in some implementations additionally include the reverse of the change at 21, e.g., after the oscillator has been restarted by the energy pulse at 24, such that at 21 the first signal of the control signal changes from a first state to a second state, and at 23 the first signal of the control signal changes back from the second state to the first state. The primary side detects this change of states. For example, when the control system has the first state and the changes to the second state, upon detecting the second state the oscillator is switched off.

Then, the method jumps back to 21, such that the controlled variable is regulated.

FIG. 3 shows a circuit diagram of a power converter 30 according to a further implementation.

Similarly to power converter 10 of FIG. 1, power converter 30 comprises the transformer 13 including primary side winding 13A and secondary side winding 13B and oscillator circuit 15 which together with primary side winding 13A forms a resonant oscillator. The primary side is supplied by a voltage VCC1, and the power converter outputs a voltage VCC2 which corresponds to the voltage Vout of FIG. 1.

An output circuit being an example of output circuit 11 of FIG. 1 is formed by a capacitor 31 serving as a filter and energy storage and a diode 37 serving as a rectifier. Capacitor 31 may be an external capacitor, while other components on the secondary side are integrated in a circuit on a secondary side chip die.

Figure 4:
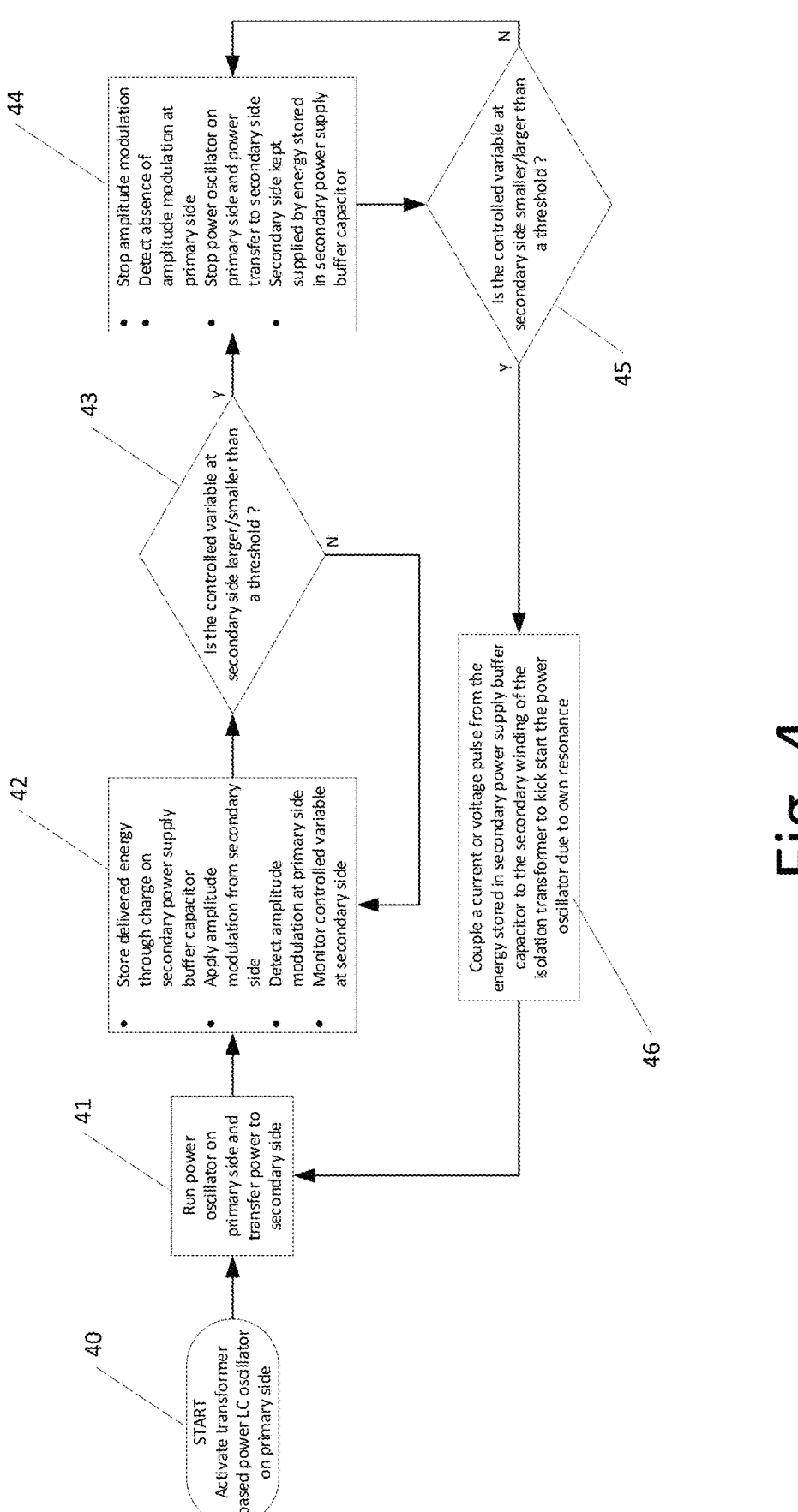
FIG. 4 is a flowchart illustrating a method according to an implementation.

A primary side controller corresponding to controller 16 of FIG. 1 in the example of FIG. 3 comprises a demodulator 38 and a startup/stop circuit 35, and a secondary side controller comprises a hysteresis comparator 34, a wake-up pulse generator 36, a modulator 32 and a low frequency (LF) oscillator 33. Low frequency in this case means that the frequency of a signal generated by low frequency oscillator 33 is lower than a resonant frequency of the resonant oscillator, for example at least 2× lower, at least 5× lower, at least 10× lower or at least 50× lower. In some implementations, the control signal may cause a peak to appear at the primary side, and in this case as demodulator a peak detector may be used. Operation of the implementation of FIG. 3 will now be explained based on FIG. 4, which is a flowchart of a method according to an implementation that may be implemented using power converter 30 of FIG. 3, or also other power converters like the power converters of FIGS. 5 and 6 explained further below.

The method starts at 40 with activating the resonant transformer formed by primary side winding 13 and oscillator circuit 15 using startup/stop circuit 35, for example by feeding power to oscillator circuit 15. At 41, the oscillator is running and transfers power to the secondary side, in particular to secondary side winding 13B, which causes output voltage VCC2 to be generated.

In particular, this transferring of power at 42 causes energy to be stored in capacitor 31 to build up voltage VCC2. Furthermore, modulator 32 applies a modulation to the signal generated by low frequency oscillator 33, for example by varying a capacitance coupled to secondary side winding 13B. This modulation is detected by demodulator 38 on the primary side. As long as the modulation is detected by demodulator 38, the oscillation of the resonant oscillator on the primary side is maintained.

Furthermore, the controlled variable, in the example of FIG. 3 VCC2, is monitored on the secondary side. In the example of FIG. 3 this is done using hysteresis comparator 34. In case VCC2 exceeds a reference voltage VREF plus a hysteresis threshold of hysteresis comparator 34, at 43 it is found that the controlled variable is larger than a threshold. As mentioned above, in case of negative voltages or current this may apply to the absolute values, or the value (with sign) falling below a threshold. As long as this is not the case the method remains at 42. As soon as this is the case, the output of hysteresis comparator 34 stops the amplitude modulation and/or the oscillation of low frequency oscillator 33. On the primary side, demodulator 38 then detects the absence of the modulation, which causes startup/stop circuit 35 to stop the oscillation of the resonant oscillator, for example by stopping supplying power to the oscillator.

At 45, the method comprises checking if the controlled variable falls below a threshold again, for example hysteresis comparator 34 detecting that VCC2 falls beneath VREF minus a hysteresis threshold. At 44, therefore no energy is transferred, but the output VCC2) will still be supplied by energy stored in capacitor 31.

As soon as the checking at 45 is negative, the method remains at 44, and once it is positive, the method proceeds to 46. Here, wake-up pulse generator 36 causes a wake-up pulse to be applied to secondary side winding 13B transferring power to the primary side which in turn causes the resonant oscillator to start again due to its resonance. Furthermore, low frequency oscillator 33 and/or modulator 32 are started again such that the modulated control signal is again generated, and then the method proceeds back to 41.

Figure 5:
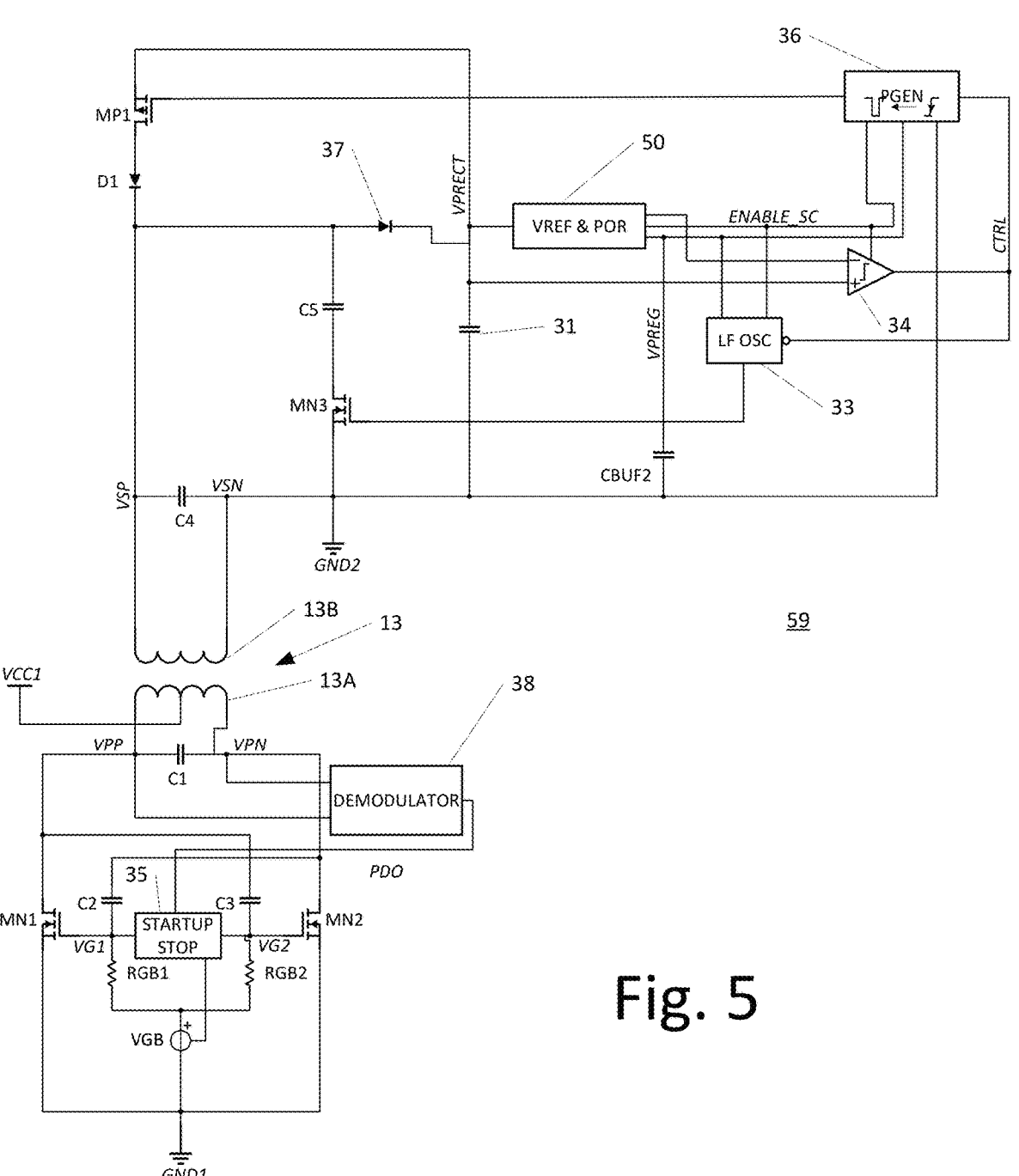
FIG. 5 is a circuit diagram of a power converter according to an implementation.

FIG. 5 shows a power converter 59 according to a further implementation. Power converter 59 is an extension of the power converter of FIG. 3, and corresponding elements bear the same reference numerals and will not be described again in detail.

On a primary side in FIG. 5, an example of oscillator circuit 15 is shown including a capacitor C1 forming a resonant oscillator with a self and mutual inductance of transformer 13, including primary side winding 13A, and the oscillator circuit further comprises NMOS transistors MN1, MN2 which are cross coupled using capacitors C2, C3 and resistors RGB1, RGB2 coupled to a supply VGB. This together forms essentially a conventional oscillator with cross coupled transistors. During oscillation, transistors MN1, MN2 are alternatively switched on and off by the oscillation due to the cross coupling, such that always one transistor is on and the other is off. Startup/stop circuit 35 may comprises gate drivers and logic for NMOS transistors MN1, MN2. To start oscillation, for example at step 40 of FIG. 4, startup/stop circuit 35 switches one of transistors MN1, NM2 on while the other transistor is off.

To stop the oscillation, startup/stop circuit switches both transistor NM1, NM2 fully off. In implementations like the implementations of FIGS. 3 and 5 where wake-up pulse generator 36 is used for restarting the oscillation using a wake-up pulse, after switching transistors NM1, NM2 fully off, their gate can be set to a condition where it is easy to restart the oscillator by the wake-up pulse.

For this, transistors MN1 and MN2 may be kept off and ready to restart by setting their gate-source voltage slightly below their gate-source activation voltage threshold. In sub-threshold operation transistors MN1 and MN2 only experience little sub-threshold drain current leakage, assumed to be negligible and corresponding to a practical full turn off of MN1 and MN2. The gate of MN1 or MN2 may be pulled above the threshold voltage in an asymmetric fashion, such that the wake-up pulse can quickly restart the oscillation.

Alternatively, after the full turn off, the gates of MN1 and MN2 may be weakly pulled down (e.g., with a high ohmic R), so that that pull down is easy to override with the wake up pulse.

The secondary side, in addition to the components already discussed referring to FIG. 3, comprises a component 50 which generates the reference voltage VREF, to be supplied to hysteresis comparator 34 and also includes a power on reset (POR) functionality which powers the various components on the secondary side on startup. As in FIG. 3, low-frequency oscillator 33 is activated and deactivated based on an output signal CTRL of hysteresis comparator 33. The modulator 32 of FIG. 3 is implemented by a capacitor C5 in series with a transistor NM3 which is controlled by an oscillating signal MOD output by low-frequency oscillator 33. This effectively switches capacitor C5 on and off, in addition to capacitor C4 coupled in parallel to secondary side winding 13B, thus effecting a modulation due to the varying capacitance.

The wake-up pulse is generated by pulse generator 36 controlling a transistor NP1 to provide the pulse to secondary side winding 13B, optionally via a diode D1. An additional buffer capacitor CBUF2, which may also be an external capacitor, may be provided for the buffering of power supplied on the secondary side.

Figure 6:
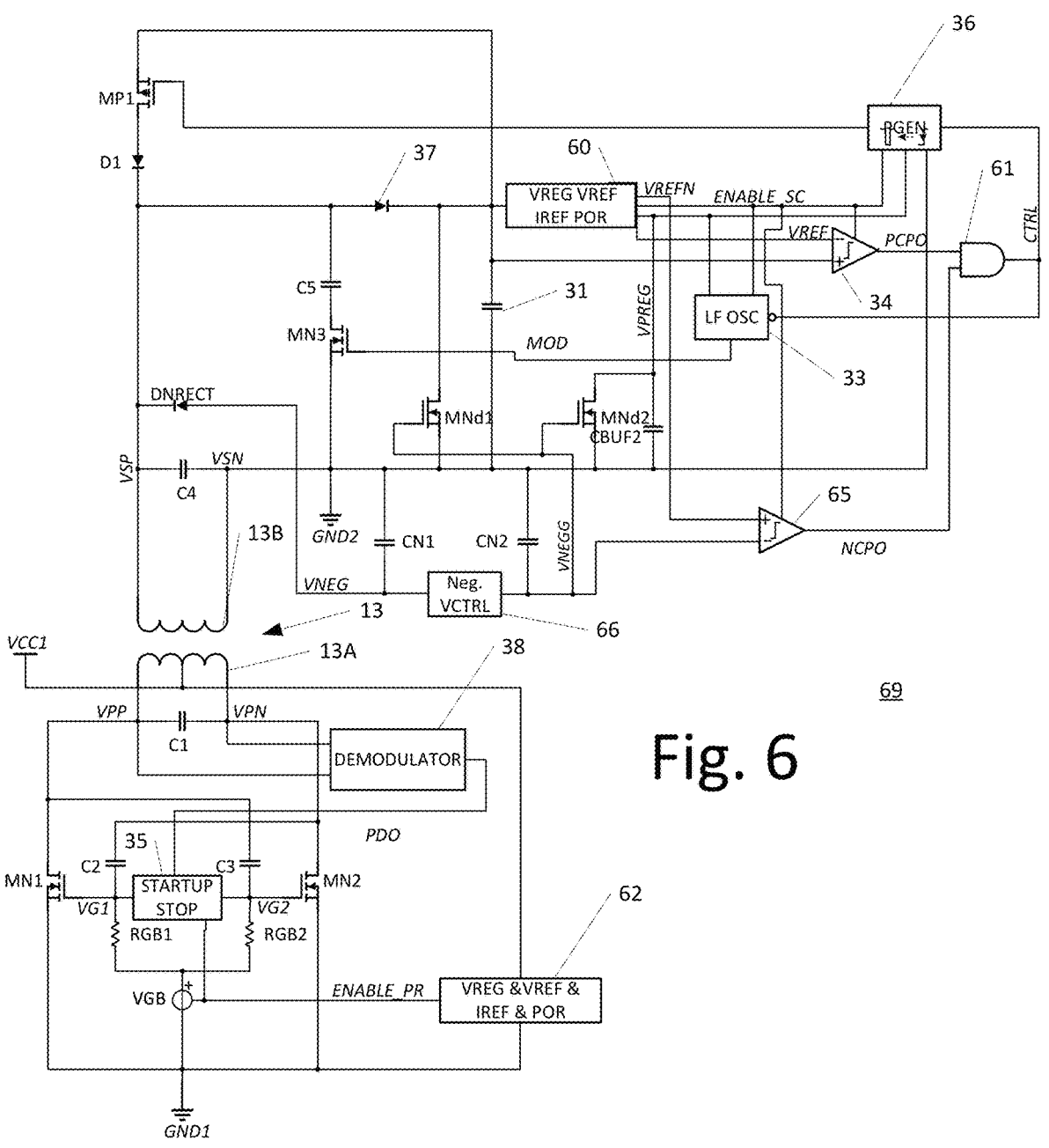
FIG. 6 is a circuit diagram of a power converter according to an implementation.

FIG. 6 is a circuit diagram of a power converter 69 according to a further implementation, which implements additional optional functions to the implementation of FIG. 5.

On the primary side, in FIG. 6 a block 62 is provided which provides power on reset (POR) functions as well as reference voltages and currents VREG, VREF and IREF to be used by the primary side circuit. On the secondary side, additionally a power down mode is provided. To supply corresponding voltages, in contrast to block 50 of FIG. 5, block 60 in FIG. 6 provides more reference voltages and currents, for example additionally negative reference voltage VREFN).

For the power down mode, a rectifying diode DNRECT is used together with a capacitor CN1 to implement a negative rectifier, where a negative voltage VNEG with respect to a secondary side ground GND2 is generated. The negative voltage is used to bias gates of depletion NMOS transistors MNd1 and MNd2 such that they are switched off as soon as the power conversion of the power converter 30 starts. A capacitor CN2 is coupled between an output biasing of a control block 66 for the negative voltage biasing transistors MNd1, MNd2 and ground GND2 as shown. Block 66 is a conditioning block which adapts the negative rectified voltage VNEG to voltage levels allowed by the gates of MNd1 and MNd2, the conditioned voltage labelled VNEGG in FIG. 6, and also for discharging the gates of MNd1 and MNd2 to determine the power down state, with MNd1 and MNd2 conducting again if no power conversion is carried out and therefore no negative voltage is generated.

In implementations, the deactivation of MNd1 and MNd2 occurs immediately after power conversion starts, such that the output voltage may be built up at capacitor 31. For this, some capacitance of CN1 and CN2 may be much lower than the capacitance of capacitor 31. To control generation of the negative voltage, an additional hysteresis comparator 65 is provided which compares the negative voltage VNEGC to a negative reference voltage VREFN, and the output of comparator 65 is combined with the output voltage of comparator 34 in an OR gate 61, which controls wake-up generator 36 and low frequency oscillator 33 as discussed, such that energy transfer is also restarted when the voltage VNEGC leaves a target range. An output signal of hysteresis comparators 34 is labelled PCPO in FIG. 6, and an output of comparator 65 is labelled NCPO.

Figure 7:
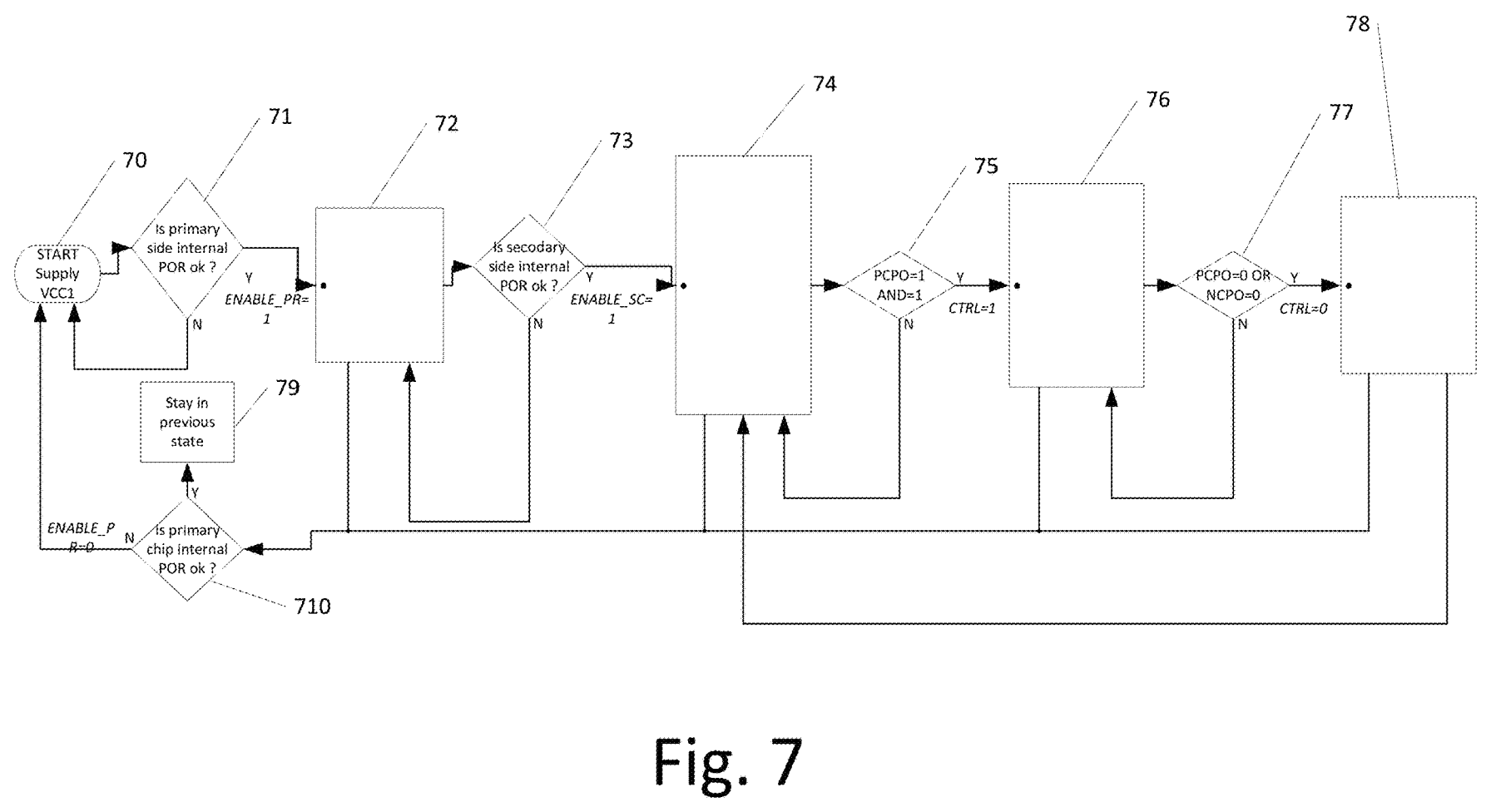

FIG. 7 is a flowchart of a method which illustrates operation of power converters 50 and 60 of FIGS. 5 and 6. When the method of FIG. 7 is applied to the implementation of FIG. 5, parts of the method described below which refer to the additional functions of FIG. 6 (compared to FIG. 5) are not implemented. It should be noted that the various additional functions of FIG. 6 compared to FIG. 5 may be implemented independently from each other.

FIG. 7 represents the method in form of a state diagram.

The method starts at 70 with starting to supply the input voltage VCC1 to the primary side of the power converter. The method then proceeds to state 72, if at 71 a check if the power on reset of the primary side is OK and operating (for example POR of block 62 of FIG. 6) is successful, e.g., the primary side is correctly supplied with power. As long as this is not the case ("N" at 71), the power converter remains in the startup phase of state 70.

At 72, the resonant oscillator on the primary side is started, for example by startup/stop circuit 35 as described above. This starts the energy transfer to the secondary side. This in turn causes the voltages VNEG, VNEGG to decrease quickly to values below 0V defined by GND2 and below VREFN, and transistors MNd1, MNd2 are switched off. A voltage VPRECT supplying VREF and POR block 50 of FIGS. 5 and 6 is growing. At this state, control signal PDO output by demodulator 38 is ignored, and startup/stop circuit 35 does not switch off the resonant oscillator regardless of the state of signal PDO (as at this stage the secondary side modulation is not running yet, because the secondary side power supply is still ramping up, and a voltage level provided is lower than a power-on-reset level defined for the secondary side).

To transition to the next state 74, at 73 the method comprises checking if the secondary side POR (block 50 of FIG. 5 or 60 of FIG. 6) is OK, e.g., delivers the respective reference voltages, supply voltages and currents.

If this is the case, signal ENABLE_SC is set to 1, and in block 71 comparators 34, 65 are enabled, frequency oscillator 33 is enabled, and transistor MN3 modulates the signal at secondary side winding 13B (which corresponds to modulating the voltage difference VSP-VSN across capacitor C4) through capacitor C5 according to the signal MOD. Demodulator 38 detects the amplitude modulation (for example by peak detection) and asserts signal PDO, which is monitored by startup/stop circuit 35, and as long as signal PDO is asserted, the primary side oscillation continues.

The method remains in state 74 until at 75 it is determined that the output signal PCPO of comparator 34 and the output signal NCPO of comparator 65 have switched to 1 (simultaneously or one after the other), at which time the control signal CTRL output by of AND gate 61 switches to 1. This means that both the negative voltage and the positive output voltages are (in absolute values) above a first threshold, and then at 26 the control signal CTRL=1 causes oscillator 33 to be switched off and the modulation therefore to stop. This is detected demodulator 38, which changes signal PDO and causes startup/stop circuit to stop the oscillation of the resonant oscillator on the primary side, for example by switching transistors MN1, MN2 off as discussed.

The power converter remains in the state until at 77 PCPO or NCPO becomes 0, meaning that either a positive supply voltage falls below the second threshold or the negative voltage rises above a respective second threshold (also meaning that the absolute value drops below a corresponding threshold). This causes transistor NP1 to send a wake-up pulse through the transformer starting oscillation of the resonant oscillator. Therefore, the resonant oscillator of the primary side starts again. Furthermore, low frequency oscillator 33 is enabled again, such that the modulation resumes and start/stop circuit 35 does not stop the oscillation. The method then proceeds to state 74.

Furthermore, throughout states 72-78 the primary side POR may be monitored, and at 710, and as long as it is OK no change in state occurs (79). If an error in the primary side POR is detected, the power converter is stopped meaning that ENABLE_PR is set to 0 and the method starts again at 70.

ASPECTS

Some implementations are defined by the following aspects.

Aspect 1. A power converter, comprising:
a transformer comprising a primary side winding and a secondary side winding,
an oscillator circuit coupled to the primary side winding and forming a resonant oscillator with an inductance provided by the transformer,
an output circuit coupled to the secondary side winding and configured to generate an output signal based on energy received from the secondary side winding,
a primary side controller and a secondary side controller,
wherein the secondary side controller is configured to transmit a control signal based on a controlled variable related to the output signal via the transformer to the primary side controller, and wherein the primary side controller is configured to start or stop an oscillation of the resonant oscillator based on the control signal.

Aspect 2. The power converter of Aspect 1, wherein the primary side controller is configured to start the oscillation of the resonant oscillator at a startup of the power converter.

Aspect 3. The power converter of Aspect 1 or 2, wherein the secondary side controller is configured to change a first signal of the control signal from a first state to a second state in response to the controlled variable exceeding a first threshold value, and wherein the primary side controller is configured to stop the oscillation of the resonant oscillator upon detecting the change of the control signal from the first state to the second state.

Aspect 4. The power converter of Aspect 3, wherein the first state corresponds to a presence of a signal, and the second state corresponds to an absence of the signal.

Aspect 5. The power converter of Aspect 4, wherein the presence of the signal corresponds to providing a modulation signal the secondary side winding, and the absence of the signal corresponds to not providing the modulation signal to the secondary side winding.

Aspect 6. The power converter of any one of Aspects 3 to 5, wherein the secondary side controller is configured to change the first signal of the control signal from the second state to the first state in response to the controlled variable falling below a second threshold value.

Aspect 7. The power converter of any one of Aspects 1 to 6, wherein the secondary side controller includes a pulse generator configured to transmit, as a second signal of the control signal, a wake-up pulse via the transformer configured to start oscillation of the resonant oscillator in response the controlled variable falling below a third threshold value.

Aspect 8. The power converter of Aspect 6 and of Aspect 7, wherein the second threshold value is equal to the third threshold value.

Aspect 9. The power converter of Aspect 7 or 8, wherein an energy transmitted to the primary side by the wake-up pulse is dimensioned to turn a transistor of the resonant oscillator on.

Aspect 10. The power converter of any one of Aspects 1 to 9, wherein the secondary side controller comprises a local oscillator circuit for generating the control signal, wherein a frequency of the local oscillator circuit is smaller than a frequency of the resonant oscillator.

Aspect 11. The power converter of any one of Aspects 1 to 10, wherein the secondary side controller is further configured to be at least partially switched off before a wake-up starting the resonant oscillator.

Aspect 12. A method of operating a power converter comprising:
transmitting a control signal based on a controlled variable related to an output signal of the power converter from a secondary side of the power converter to a primary side of the power converter via a transformer separating the primary side from the secondary side, wherein the transformer is also used to transfer energy from the primary side to the secondary side, and
starting or stopping an oscillation of a resonant oscillator of the power converter including an inductance provided by the transformer based on the control signal received at the primary side.

Aspect 13. The method of Aspect 12, further comprising starting the oscillation of the resonant oscillator at a startup of the power converter.

Aspect 14. The method of Aspect 12 or 13, further comprising changing a first signal of the control signal from a first state to a second state in response to a controlled variable exceeding a first threshold value, and wherein starting or stopping the oscillation comprises stopping the oscillation of the resonant oscillator upon detecting the change of the control signal from the first state to the second state.

Aspect 15. The method of Aspect 14, wherein the first state corresponds to a presence of a signal, and the second state corresponds to an absence of the signal.

Aspect 16. The method of Aspect 15, wherein the presence of the signal corresponds to providing a modulation signal to a secondary side winding of the transformer, and the absence of the signal corresponds to not providing the modulation signal to the secondary side winding.

Aspect 17. The method of any one of Aspects 13 to 15, wherein the method further comprises changing the first signal of the control signal from the second state to the first state in response to the controlled variable falling below a second threshold value.

Aspect 18. The method of any one of Aspects 12 to 17, wherein the method further comprises transmitting, as a second signal of the control signal, a wake-up pulse via the transformer to start oscillation of the resonant oscillator in response to the controlled variable falling below a third threshold value.

Aspect 19. The method of Aspect 17 and of Aspect 18, wherein the second threshold value is equal to the third threshold value.

Aspect 20. The method of Aspect 18 or 19, wherein an energy transmitted to the primary side by the wake-up pulse is dimensioned to turn a transistor of the resonant oscillator on.

Aspect 21. The method of any one of Aspects 12 to 20, further comprising at least partially switching off a secondary side controller on the secondary side before a startup starting the resonant oscillator.

Aspect 22. A power converter, comprising: a transformer comprising a primary side winding and a secondary side winding; an oscillator circuit coupled to the primary side winding and forming a resonant oscillator with an inductance provided by the transformer; an output circuit coupled to the secondary side winding and configured to generate an output signal based on energy received from the secondary side winding; a primary side controller; and a secondary side controller, wherein the secondary side controller is configured to transmit a first control signal, via the transformer to the primary side controller, based on a controlled variable related to the output signal, wherein the secondary side controller is configured to change the first control signal from a first state to a second state in response to the controlled variable exceeding a first threshold value, wherein the secondary side controller includes a pulse generator configured to generate, as a second control signal, a wake-up pulse in response to the controlled variable falling below a second threshold value, and transmit the wake-up pulse via the transformer to the primary side controller, wherein the primary side controller is configured to start or stop an oscillation of the resonant oscillator based on the first control signal, including stopping the oscillation of the resonant oscillator based on detecting the change of the first control signal from the first state to the second state, and wherein the primary side controller is configured to start the oscillation of the resonant oscillator based on detecting the wake-up pulse.

Although specific implementations have been illustrated and described herein, it will be appreciated by those of ordinary skill in the art that a variety of alternate and/or equivalent implementations may be substituted for the specific implementations shown and described without departing from the scope of the present implementation. This application is intended to cover any adaptations or variations of the specific implementations discussed herein. Therefore, it is intended that this implementation be limited only by the claims and the equivalents thereof.

The invention claimed is:

1. A power converter, comprising:
   a transformer comprising a primary side winding and a secondary side winding;
   an oscillator circuit coupled to the primary side winding and forming a resonant oscillator with an inductance provided by the transformer;
   an output circuit coupled to the secondary side winding and configured to generate an output signal based on energy received from the secondary side winding; and
   a primary side controller and a secondary side controller, wherein the secondary side controller is configured to transmit a control signal based on a controlled variable related to the output signal via the transformer to the primary side controller, and wherein the primary side controller is configured to start or stop an oscillation of the resonant oscillator based on the control signal,
   wherein the secondary side controller is configured to change a first signal of the control signal from a first state to a second state in response to the controlled variable exceeding a first threshold value,
   wherein the primary side controller is configured to stop the oscillation of the resonant oscillator based on detecting a change of the control signal from the first state to the second state, and
   wherein the secondary side controller includes a pulse generator configured to transmit, as a second signal of the control signal, a wake-up pulse via the transformer configured to start oscillation of the resonant oscillator in response to the controlled variable falling below a third threshold value.

2. The power converter of claim 1, wherein the primary side controller is configured to start the oscillation of the resonant oscillator at a startup of the power converter.

3. The power converter of claim 1, wherein the first state corresponds to a presence of a signal, and the second state corresponds to an absence of the signal.

4. The power converter of claim 3, wherein the presence of the signal corresponds to providing a modulation signal to the secondary side winding, and the absence of the signal corresponds to not providing the modulation signal to the secondary side winding.

5. The power converter of claim 1, wherein the secondary side controller is configured to change the first signal of the control signal from the second state to the first state in response to the controlled variable falling below a second threshold value.

6. The power converter of claim 5, wherein the second threshold value is equal to the third threshold value.

7. The power converter of claim 1, wherein an energy transmitted to the primary side by the wake-up pulse is dimensioned to turn a transistor of the resonant oscillator on.

8. The power converter of claim 1, wherein the secondary side controller comprises a local oscillator circuit for generating the control signal, wherein a frequency of the local oscillator circuit is smaller than a frequency of the resonant oscillator.

9. The power converter of claim 1, wherein the secondary side controller is further configured to be at least partially switched off before a wake-up starting the resonant oscillator.

10. A method of operating a power converter comprising:

transmitting a control signal based on a controlled variable related to an output signal of the power converter from a secondary side of the power converter to a primary side of the power converter via a transformer separating the primary side from the secondary side, wherein the transformer is also used to transfer energy from the primary side to the secondary side;

starting or stopping an oscillation of a resonant oscillator of the power converter including an inductance provided by the transformer based on the control signal received at the primary side;

changing a first signal of the control signal from a first state to a second state in response to a controlled variable exceeding a first threshold value, wherein starting or stopping the oscillation comprises stopping the oscillation of the resonant oscillator based on detecting a change of the control signal from the first state to the second state; and transmitting, as a second signal of the control signal, a wake-up pulse via the transformer to start oscillation of the resonant oscillator in response to the controlled variable falling below a third threshold value.

11. The method of claim 10, further comprising:

changing the first signal of the control signal from the second state to the first state in response to the controlled variable falling below a second threshold value.

12. The method of claim 10, wherein the first state corresponds to a presence of a signal, and the second state corresponds to an absence of the signal.

13. The method of claim 12, wherein the presence of the signal corresponds to providing a modulation signal to a secondary side winding of the transformer, and the absence of the signal corresponds to not providing the modulation signal to the secondary side winding.

14. The method of claim 11, wherein the second threshold value is equal to the third threshold value.

15. The method of claim 11, wherein an energy transmitted to the primary side by the wake-up pulse is dimensioned to turn a transistor of the resonant oscillator on.

16. The method of claim 11, further comprising:

at least partially switching off a secondary side controller on the secondary side before a startup starting the resonant oscillator.

17. A power converter, comprising:

a transformer comprising a primary side winding and a secondary side winding;

an oscillator circuit coupled to the primary side winding and forming a resonant oscillator with an inductance provided by the transformer;

an output circuit coupled to the secondary side winding and configured to generate an output signal based on energy received from the secondary side winding;

a primary side controller; and a secondary side controller, wherein the secondary side controller is configured to transmit a first control signal, via the transformer to the primary side controller, based on a controlled variable related to the output signal, wherein the secondary side controller is configured to change the first control signal from a first state to a second state in response to the controlled variable exceeding a first threshold value, wherein the secondary side controller includes a pulse generator configured to generate, as a second control signal, a wake-up pulse in response to the controlled variable falling below a second threshold value, and transmit the wake-up pulse via the transformer to the primary side controller, wherein the primary side controller is configured to start or stop an oscillation of the resonant oscillator based on the first control signal, including stopping the oscillation of the resonant oscillator based on detecting the change of the first control signal from the first state to the second state, and wherein the primary side controller is configured to start the oscillation of the resonant oscillator based on detecting the wake-up pulse.

\* \* \* \* \*